(12) United States Patent
Suzuki et al.

(10) Patent No.: US 11,020,942 B2
(45) Date of Patent: Jun. 1, 2021

(54) LAMINATE, MULTILAYERED STRUCTURE, AND METHOD FOR PRODUCING THE SAME

(71) Applicant: KURARAY CO., LTD., Kurashiki (JP)

(72) Inventors: Makoto Suzuki, Kurashiki (JP); Yasuhiro Nonaka, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 278 days.

(21) Appl. No.: 16/305,683

(22) PCT Filed: May 31, 2017

(86) PCT No.: PCT/JP2017/020316
§ 371 (c)(1),
(2) Date: Nov. 29, 2018

(87) PCT Pub. No.: WO2017/209198
PCT Pub. Date: Dec. 7, 2017

(65) Prior Publication Data
US 2020/0316920 A1    Oct. 8, 2020

(30) Foreign Application Priority Data
May 31, 2016   (JP) .............................. JP2016-108064

(51) Int. Cl.
| | |
|---|---|
| B32B 7/12 | (2006.01) |
| B32B 25/08 | (2006.01) |
| B32B 25/16 | (2006.01) |
| B32B 27/08 | (2006.01) |

(Continued)

(52) U.S. Cl.
CPC ............... *B32B 25/08* (2013.01); *B32B 7/12* (2013.01); *B32B 25/16* (2013.01); *B32B 27/08* (2013.01);

(Continued)

(58) Field of Classification Search
CPC ........ B32B 2250/42; B32B 2307/7242; B32B 25/08; B32B 25/14; B32B 25/16;
(Continued)

(56) References Cited

U.S. PATENT DOCUMENTS

| | | |
|---|---|---|
| 6,582,786 B1 | 6/2003 | Bonk et al. |
| 2001/0008687 A1 | 7/2001 | Kollaja et al. |

(Continued)

FOREIGN PATENT DOCUMENTS

| | | |
|---|---|---|
| CN | 102712183 | 10/2012 |
| CN | 103732398 | 4/2014 |

(Continued)

OTHER PUBLICATIONS

International Search Report dated Aug. 29, 2017 in PCT/JP2017/020316 Filed on May 31, 2017.

(Continued)

*Primary Examiner* — Lawrence D Ferguson
(74) *Attorney, Agent, or Firm* — Oblon, McClelland, Maier & Neustadt, L.L.P.

(57) ABSTRACT

Provided are: a laminate having an outer surface thereof that is highly adhesive to a rubber material, and having sufficient gas barrier properties, interlayer adhesiveness and flex resistance; a multilayered structure including such a laminate; and a method for producing the same. A laminate including: a plurality of gas barrier layers (A) formed from a polymer including a gas barrier resin; and an elastomer layer (B) including at least one adhesive layer (B1), wherein a sum of number of the gas barrier layers (A) and number of the elastomer layer (B) is 5 or greater and 300 or less, the adhesive layer (B1) is laminated as at least an outermost layer, and the adhesive layer (B1) includes a styrene elastomer and is formed from a polymer having an iodine value of 200 or greater and 300 or less.

11 Claims, 2 Drawing Sheets

(a)

(b)

(51) Int. Cl.
*B32B 27/30* (2006.01)
*B32B 27/40* (2006.01)

(52) U.S. Cl.
CPC ............ *B32B 27/306* (2013.01); *B32B 27/40* (2013.01); *B32B 2250/42* (2013.01); *B32B 2307/7242* (2013.01)

(58) Field of Classification Search
CPC ......... B32B 27/00; B32B 27/08; B32B 27/30; B32B 27/306; B32B 27/40; B32B 7/12
See application file for complete search history.

(56) References Cited

U.S. PATENT DOCUMENTS

| 2005/0147778 | A1 | 7/2005 | Tai et al. |
| 2013/0112330 | A1 | 5/2013 | Tomoi et al. |
| 2016/0152075 | A1 | 6/2016 | Shibata |

FOREIGN PATENT DOCUMENTS

| EP | 2 508 342 A1 | 10/2012 |
| EP | 2 594 399 A1 | 5/2013 |
| EP | 2 878 457 A1 | 6/2015 |
| JP | 2002-524317 A | 8/2002 |
| JP | 2003-512201 A | 4/2003 |
| JP | 2014-34647 A | 2/2014 |
| JP | 2014-218633 A | 11/2014 |
| JP | 2015-6737 A | 1/2015 |
| WO | WO 00/15067 A1 | 3/2000 |
| WO | WO 01/28769 A1 | 4/2001 |
| WO | WO 03/072653 A1 | 9/2003 |
| WO | WO 2012/008183 A1 | 1/2012 |

OTHER PUBLICATIONS

Extended European Search Report dated Oct. 18, 2019 in European Patent Application No. 17806749.2, 9 pages.

(a)

(b)

(a)

(b)

LAMINATE, MULTILAYERED STRUCTURE, AND METHOD FOR PRODUCING THE SAME

TECHNICAL FIELD

The present invention relates to a laminate, a multilayered structure, and a method for producing the same.

BACKGROUND ART

Films obtained by using a resin having gas barrier properties such as an ethylene-vinyl alcohol copolymer find a wide range of applications such as packaging materials for food, medical practice, and the like. Recently, for the purpose of improving various types of performance such as gas barrier properties, a variety of laminates have been proposed in which a plurality of resin layers each having a thickness of micron order or submicron order are laminated.

Conventional laminates developed so far in which a plurality of resin layers of the ethylene-vinyl alcohol copolymer are laminated include, for example: (1) elastomeric barrier films in which 10 or more layers of microlayer polymeric composites formed from a fluid barrier material such as an ethylene-vinyl alcohol copolymer and from an elastomer material such as thermoplastic polyurethane are alternately laminated (Patent Document 1); (2) a multilayer film including alternate layers of a hard polymer material such as an ethylene-vinyl alcohol copolymer, and of a flexible polymer material (Patent Document 2); and the like.

In such laminates having a multilayer structure, superior interlayer adhesiveness is important for improving flex resistance as well as other durability and the like. On the other hand, a laminate having a gas barrier layer and an elastomer layer may be used through bonding together with a filmy rubber material, taking advantages of superior gas barrier properties, stretchability and the like, in an inner liner for a pneumatic tire, an inner package of an accumulator, an inflated ball, an air spring or the like, for example. However, since bonding the rubber material and the conventional laminate together via an adhesive is necessary, a step of e.g., applying the adhesive leads to inconvenience. Therefore, development of a laminate that can be adhered to a rubber material without using an adhesive and that is superior in interlayer adhesiveness is desired.

PRIOR ART DOCUMENTS

Patent Documents

Patent Document 1 Japanese Unexamined Patent Application (Translation of PCT Application), Publication No. 2002-524317

Patent Document 2 Japanese Unexamined Patent Application (Translation of PCT Application), Publication No. 2003-512201

SUMMARY OF THE INVENTION

Problems to be Solved by the Invention

The present invention was made in view of the foregoing circumstances, and an object of the present invention is to provide: a laminate having an outer surface that is highly adhesive to a rubber material, and having sufficient gas barrier properties, interlayer adhesiveness and flex resistance; a multilayered structure including such a laminate; and a method for producing the same.

Means for Solving the Problems

According to one aspect of the invention made for solving the foregoing problems, a laminate comprises: a plurality of gas barrier layers (A) formed from a polymer comprising a gas barrier resin; and an elastomer layer (B) comprising at least one adhesive layer (B1), wherein a sum of number of the gas barrier layers (A) and number of the elastomer layer (B) is 5 or greater and 300 or less, the adhesive layer (B1) is laminated as at least one outermost layer, and the adhesive layer (B1) comprises a styrene elastomer and is formed from a polymer having an iodine value of 200 or greater and 300 or less.

In the laminate, the adhesive layer (B1) constituting at least one outermost layer is formed from a polymer, and the polymer includes a styrene elastomer and has an iodine value of 200 or greater. In other words, a polymer such as a styrene elastomer that forms the adhesive layer (B1) constituting the at least one outermost layer has sufficient double bond(s), and the adhesive layer (B1) is capable of adhering to a rubber material more favorably through a crosslinking reaction such as vulcanization. Furthermore, the polymer that forms the adhesive layer (B1) has an iodine value of 300 or less, thereby enabling a sufficient amount of the functional group to be introduced into the styrene elastomer. Due to including the functional group, the adhesive layer (B1) is capable of adhering favorably to a layer of a material other than the rubber material; therefore, the laminate enables the interlayer adhesiveness to be enhanced. In addition, since a sum of the number of the gas barrier layers (A) and the number of the elastomer layer (B) falls within the above range, the laminate is capable of exhibiting favorable flex resistance and the like.

The styrene elastomer preferably comprises an epoxy group in a main chain thereof. The content of the epoxy group in the total polymer from which the adhesive layer (B1) is formed is preferably 0.1 mmol/g or greater and 2 mmol/g or less. When the epoxy group is included in such a content, the adhesive layer (B1) can exhibit more enhanced adhesive force to the gas barrier layer (A).

The average thickness of each one layer of the gas barrier layer (A) is preferably 0.1 µm or greater and 15 µm or less, and the average thickness of each one layer of the elastomer layer (B) is preferably 0.1 µm or greater and 30 µm or less. When the gas barrier layer (A) and the elastomer layer (B) are laminated to be thus thinner, the interlayer adhesiveness, the flex resistance and the like can be more enhanced.

An average thickness of the adhesive layer (B1) laminated as the outermost layer is preferably 0.1 µm or greater and 10 µm or less. When the average thickness of the adhesive layer (B1) as the outermost layer falls within the above range, the adhesiveness to the rubber material can be more enhanced.

The total thickness of all the gas barrier layers (A) and all the elastomer layer (B) is preferably 15 µm or greater and 500 µm or less. When the total thickness of the gas barrier layers (A) and the elastomer layer (B) falls within the above range, the interlayer adhesiveness, the gas barrier properties, the flex resistance and the like can be more enhanced while film thinning is attempted.

The elastomer layer (B) preferably comprises other elastomer layer (B2) than the adhesive layer (B1). Accordingly, the flex resistance and the like of the laminate can be more enhanced.

It is preferred that the each of the gas barrier layer (A) and the other elastomer layer (B2) are laminated alternately. When each of the gas barrier layer (A) and the other elastomer layer (B2) are laminated alternately, the interlayer adhesiveness, the flex resistance and the like can be more enhanced.

The other elastomer layer (B2) is preferably formed from a polymer comprising a polyurethane elastomer. By using the polyurethane elastomer, the flex resistance, the adhesive force to gas barrier layer (A) and the like can be further enhanced.

It is preferred that every elastomer layer (B) is the adhesive layer (B1), and each of the gas barrier layers (A) and the adhesive layer (B1) are laminated alternately. Such a structure in which the gas barrier layer (A) and the adhesive layer (B1) are laminated alternately enables the interlayer adhesiveness, the flex resistance and the like to be more enhanced.

According to another aspect of the present invention made for solving the problems described above, a method for producing the laminate of the one aspect comprises coextruding: a polymer for forming the gas barrier layers (A); and a polymer for forming the elastomer layer (B). The method is capable of efficiently producing a laminate having high adhesiveness to a rubber material, with gas barrier properties, as well as sufficient interlayer adhesiveness and flex resistance.

According to still another aspect of the present invention made for solving the problems described above, a multilayered structure comprises: the laminate of the one aspect; and a diene rubber layer (C) laminated on an outer surface of the adhesive layer (B1) having been laminated as the outermost layer of the laminate. In the multilayered structure, owing to the diene rubber layer (C) laminated on the outer surface of the adhesive layer (B1) being superior in adhesiveness to the rubber material as described above, superior adhesiveness between the adhesive layer (B1) and the diene rubber layer (C) is provided. In addition, the multilayered structure also has potent adhesive force between other layers, and has favorable flex resistance.

According to yet another aspect of the present invention made for solving the problems described above, a method for producing the multilayered structure of the still another aspect comprises: coextruding a polymer for forming the gas barrier layers (A), and a polymer for forming the elastomer layer (B); and thermally bonding a diene rubber layer (C) to a structure obtained after the coextruding. The method is capable of efficiently producing, without need of a complicated step, a multilayered structure that is superior in adhesiveness between the adhesive layer (B1) and the diene rubber layer (C), and has favorable adhesiveness between other layers and the like.

Effects of the Invention

According to the aspects of the present invention, a laminate having an outer surface thereof that is highly adhesive to a rubber material, and having sufficient gas barrier properties, interlayer adhesiveness and flex resistance; a multilayered structure including such a laminate; and a method for producing the same are provided.

DESCRIPTION OF EMBODIMENTS

Hereinafter, a laminate according to an embodiment of the present invention, a method for producing the same, a multilayered structure and a method for producing the same will be described in detail.

Laminate

A laminate according to an embodiment of the present invention includes: a plurality of gas barrier layers (A) formed from a polymer including a gas barrier resin (hereinafter, may be also referred to as "A layer"); and one or a plurality of elastomer layers (B) (hereinafter, may be also referred to as "B layer") including at least one adhesive layer (B1) (hereinafter, may be also referred to as "B1 layer"), in which the B1 layer is laminated as at least an outermost layer. In a case where the laminate includes a plurality of B layers, the B layers may be all the B1 layers, or may include other elastomer layer (B2) than the B1 layer (hereinafter, may be also referred to as "B2 layer"). The laminate may be formed from only the A layer and the B layer, or may further include other resin layer and the like in addition to the A layer and the B layer.

Figure 1:
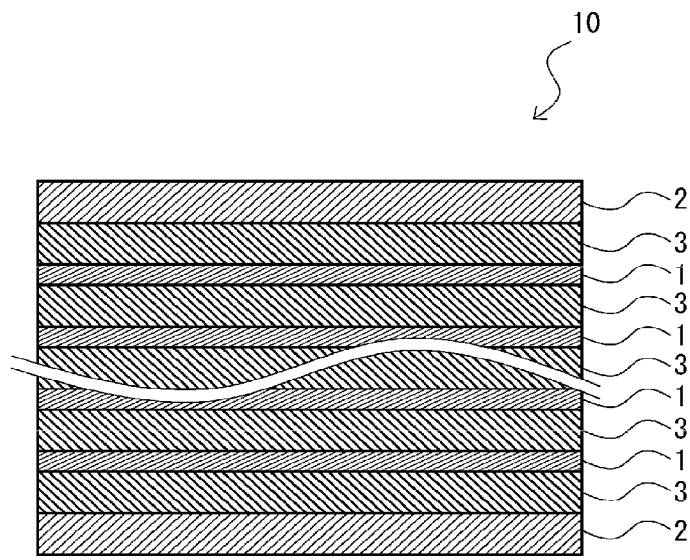
FIG. 1(a) is a schematic cross-sectional view of a laminate according to one embodiment of the present invention.
FIG. 1(b) is a schematic cross-sectional view of a laminate according to an embodiment different from the laminate shown in FIG. 1(a).
Figure 1:
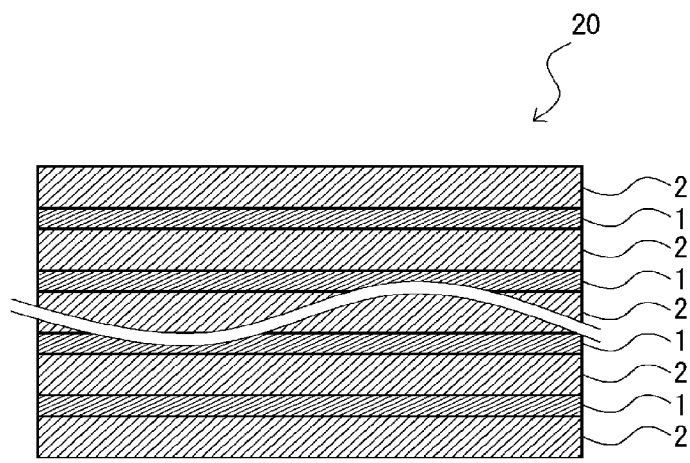

The laminate having a preferred layer structure in the embodiment of the present invention is exemplified by a laminate 10 shown in FIG. 1(a), and a laminate 20 shown in FIG. 1(b). The laminate 10 shown in FIG. 1(a) includes a plurality of A layers 1, a pair of B1 layers 2, and a plurality of B2 layers 3. The laminate 10 has a structure in which B1 layers 2 are laminated on both two outermost layer faces, respectively, of an alternating laminate of the A layers 1 and the B2 layers 3, with its outermost layers being the B2 layers 3. The laminate 20 shown in FIG. 1(b) includes a plurality of A layers 1 and a plurality of B1 layers 2. The laminate 20 is an alternating laminate of the A layers 1 and the B1 layers 2, with its both two outermost layers being the B1 layers 2. Owing to the gas barrier layer (A layer 1) and the elastomer layer (B1 layer 2 or B2 layer 3) being alternately laminated as in the laminate 10 and the laminate 20, the gas barrier properties, flexibility, the flex resistance, the interlayer adhesiveness and the like can be more effectively exhibited.

The B1 layers 2 are provided as both two outermost layers in the laminate 10 and in the laminate 20. Providing the B1 layers 2 as both the two outermost layers enable favorable adhesion to a rubber material and the like on any face side. However, the B1 layer laminated as the outermost layer is not necessary for both the two outermost layers, and the B1 layer may be provided as only one outermost layer. Meanwhile, the laminate 10 and the laminate 20 have a symmetrical layer structure. Due to the symmetrical structure, each layer can be efficiently formed by coextrusion.

The lower limit of the sum of the number of the gas barrier layer (A) and the number of the elastomer layer (B) is typically 5, preferably 8, more preferably 12, and still more preferably 16. Meanwhile, the upper limit of the sum of the number of the gas barrier layer (A) and the number of the elastomer layer (B) is typically 300, preferably 200, more preferably 100, and still more preferably 50. It is preferred that the total number of the layers in the laminate also falls within the above range. Due to the laminate having such a multilayer structure, even if defects such as pinholes and cracks are generated upon bending or the like in a single A layer, gas barrier properties can be maintained in other A layer, and consequently, characteristics such as gas barrier properties and durability of the laminate as a whole can be improved. It is to be noted that the number of the A layers is preferably 2 or greater, and more preferably 5 or greater. The number of the B layer is preferably 3 or greater, and more preferably 6 or greater.

The lower limit of the average thickness of each one A layer is preferably 0.1 µm, more preferably 0.2 µm, and still more preferably 0.3 µm. Meanwhile, the upper limit is preferably 15 µm, more preferably 5 µm, still more preferably 3 µm, and particularly preferably 2 µm. When the average thickness of each one A layer is less than the lower limit, forming to give a uniform thickness may be difficult, and the gas barrier properties and durability thereof, etc., may be deteriorated. To the contrary, when the average thickness of each one A layer is greater than the upper limit, the flexibility and the like may be deteriorated, and consequently, the durability and the like may be deteriorated.

The lower limit of the average thickness of each one B layer (each one B1 layer and each one B2 layer) is preferably 0.1 µm, more preferably 0.5 µm, still more preferably 1 µm, and particularly preferably 3 µm. Meanwhile, the upper limit is preferably 30 µm, more preferably 15 µm, still more preferably 10 µm, and particularly preferably 8 µm. When the average thickness of each one B layer is less than the lower limit, forming to give a uniform thickness may be difficult, and the durability may be deteriorated. Also, sufficient flexibility may not be exhibited. To the contrary, when the average thickness of each one B layer is greater than the upper limit, the interlayer adhesiveness and/or the gas barrier properties may be deteriorated.

In particular, the lower limit of the average thickness of the B1 layer laminated as the outermost layer is preferably 0.1 µm, more preferably 0.5 µm, still more preferably 1 µm, and particularly preferably 3 µm. Meanwhile, the upper limit is preferably 15 µm, more preferably 10 µm, still more preferably 8 µm, and particularly preferably 6 µm. When the average thickness of the adhesive layer (B1) as the outermost layer is thus comparatively small to fall within the above range, the adhesiveness to the rubber material can be enhanced.

The lower limit of the sum of the thicknesses of the A layer(s) and the B layer(s) is preferably 10 µm, more preferably 15 µm, and still more preferably 30 µm. The upper limit thereof is preferably 500 µm, more preferably 300 µm, and still more preferably 100 µm. When the sum of the thicknesses of the A layer(s) and the B layer(s) is less than the lower limit, the flex resistance, the durability, the gas barrier properties and the like may be deteriorated. When the sum of the thicknesses is greater than the upper limit, the flexibility, the formability and the like may be deteriorated, which may result in lower flex resistance and increased production cost. The sum of the thicknesses of the layers as referred to herein means the sum of the average thicknesses of the individual layers. In the laminate including only the A layers and the B layers, the sum of the thicknesses may be the thickness of the whole laminate including only the A layers and the B layers. The average thickness of each layer herein means an average value of the thicknesses measured at randomly selected 10 cross sections.

A Layer

The A layer is formed from a polymer including a gas barrier resin. The gas barrier resin included in the polymer forming the A layer enables the laminate that is superior in gas barrier properties to be obtained.

The gas barrier resin is a polymer that is a principal component of the A layer. The lower limit of the content of the gas barrier resin in the A layer (a material for forming the A layer) is, for example, 60% by mass, preferably 90% by mass, more preferably 95% by mass and still more preferably 97% by mass, and may be even more preferably 99% by mass and further more preferably 99.9% by mass. The gas barrier resin has a function of preventing permeation of gases. Specifically, the gas barrier resin as referred to herein means a resin having an oxygen permeation rate of 100 mL·20 µm/(m$^2$·day·atm) or less as determined under a condition at 20° C. and 65% RH in accordance with a method prescribed in JIS K 7126-2 (equal pressure method; 2006). The oxygen permeation rate of the gas barrier resin used in the embodiment of the present invention is preferably 50 mL·20 µm/(m$^2$·day·atm) or less, and more preferably 10 mL·20 µm/(m$^2$·day·atm) or less.

The gas barrier resin is exemplified by an ethylene-vinyl alcohol copolymer (hereinafter, also referred to as "EVOH"), a polyamide, a polyester, a polyvinylidene chloride, an acrylonitrile copolymer, a polyvinylidene fluoride, a polychlorotrifluoroethylene, a polyvinyl alcohol, and the like.

Among these gas barrier resins, a polyamide, a polyester and EVOH are preferred in light of gas barrier properties, and EVOH is particularly preferred in light of not only the gas barrier properties but also melt formability, adhesiveness to the B layer, and the like.

Polyamide

The polyamide is a polymer having an amide bond, and can be obtained by ring-opening polymerization of a lactam, polycondensation of an aminocarboxylic acid, polycondensation of an aminocarboxylic acid or a diamine with a dicarboxylic acid, or the like. Specific examples of the polyamide include: aliphatic polyamides such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11); aromatic polyamides such as polyhexamethyleneisophthalamide (nylon 61), a m-xylylenediamine/adipic acid copolymer (nylon MXD6), and a m-xylylenediamine/adipic acid/isophthalic acid copolymer; and the like. The polyamide may be used alone or as a mixture of two or more types thereof. Among these polyamides, owing to their superior gas barrier properties, aromatic polyamides are preferred, and nylon MXD6 is more preferred.

Polyester

The polyester is a polymer having an ester bond, and can be obtained by, for example, polycondensation of a polyvalent carboxylic acid with a polyol. Examples of the polyester which may be used as the gas barrier resin of the laminate include polyethylene terephthalate (PET), polyethylene naphthalate (PEN), polyglycolic acid (PGA), wholly aromatic liquid crystal polyesters, and the like. The polyester may be used alone or as a mixture of two or more types thereof. Among these polyesters, in light of superiority in gas barrier properties, PGA and wholly aromatic liquid crystal polyesters are preferred, and PGA is more preferred.

EVOH

EVOH is a polymer having an ethylene unit and a vinyl alcohol unit as principal structural units. It is to be noted that EVOH may also include one type or a plurality of types of other structural in addition to the ethylene unit and the vinyl alcohol unit. EVOH is typically obtained by polymerizing ethylene with a vinyl ester, and saponifying thus resulting ethylene-vinyl ester copolymer.

The lower limit of the content of the ethylene unit in EVOH (i.e., the proportion of the number of ethylene units with respective to the total number of monomer units in EVOH) is preferably 3 mol %, more preferably 10 mol %, still more preferably 20 mol %, and particularly preferably 25 mol %. The upper limit of the content of the ethylene unit in EVOH is preferably 70 mol %, more preferably 60 mol %, still more preferably 55 mol %, and particularly preferably 50 mol %. When the content of the ethylene unit in EVOH is less than the lower limit, the gas barrier properties and the like of the laminate under highly humid conditions may be deteriorated, or melt formability may be impaired. When the content of the ethylene unit in EVOH is greater than the upper limit, the gas barrier properties of the laminate may be deteriorated.

The lower limit of the degree of saponification of EVOH (i.e., the proportion of the number of vinyl alcohol units with respective to the total number of vinyl alcohol units and vinyl ester units in EVOH) is preferably 80 mol %, more preferably 95 mol %, and particularly preferably 99 mol %. The upper limit of the degree of saponification of EVOH is preferably 99.99 mol %. When the degree of saponification of EVOH is less than the lower limit, melt formability may be impaired, and additionally the gas barrier properties of the laminate may be deteriorated, or the coloring resistance and/or moisture resistance may be unsatisfactory. When the degree of saponification of EVOH is greater the upper limit, the improvement of the gas barrier properties and the like may not be that satisfactory despite increased costs of producing EVOH. Such EVOH may be used alone; however, an embodiment in which such EVOH is blended with EVOH having a degree of saponification greater than 99 mol % is also suitable.

EVOH preferably has a structural unit (I) represented by the following formula (I), a structural unit (II) represented by the following formula (II), a structural unit (III) represented by the following formula (III), or a combination thereof. When the EVOH has such a structural unit, the flex resistance of the laminate obtained can be more improved.

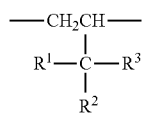
(I)

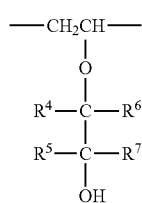
(II)

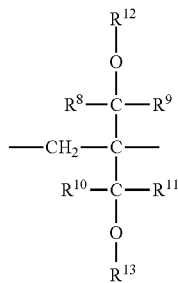
(III)

In the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^1$ and $R^2$, $R^2$ and $R^3$, or $R^1$ and $R^3$ may be bonded to each other, and a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, a carboxyl group or a halogen atom.

In the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^4$ and $R^5$, or $R^6$ and $R^7$ may be bonded to each other, and a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, an alkoxy group, a carboxyl group or a halogen atom.

In the above formula (III), $R^8$, $R^9$, $R^{10}$ and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, an alkoxy group, a carboxyl group or a halogen atom; and $R^{12}$ and $R^{13}$ each independently represent a hydrogen atom, a formyl group or an alkanoyl group having 2 to 10 carbon atoms.

The lower limit of the content of the structural unit (I), (II) or (III) with respect to all structural units is preferably 0.5 mol %, more preferably 1 mol %, and still more preferably 1.5 mol %. The upper limit of the content of the structural unit (I), (II) or (III) with respect to all structural units is preferably 30 mol %, more preferably 15 mol %, and still more preferably 10 mol %. When EVOH has the structural unit represented by the above formula (I), (II) or (III) at a proportion falling within the above range, the polymer resinous material from which the A layer is formed exhibits improved flexibility and improved processing characteristics, and consequently, the stretchability, thermoformability and the like of the laminate can be improved.

In the structural unit (I), (II) or (III), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group and the like.

In the structural unit (I), it is preferred that $R^1$, $R^2$ and $R^3$ each independently represent a hydrogen atom, a methyl group, an ethyl group, a hydroxy group, a hydroxymethyl group or a hydroxyethyl group, and it is more preferred that $R^1$, $R^2$ and $R^3$ each independently represent a hydrogen atom, a methyl group, a hydroxyl group or a hydroxymethyl group. When $R^2$ and $R^3$ are as described above, the stretchability and the thermoformability of the laminate can be further improved.

The process for allowing EVOH to include the structural unit (I) is not particularly limited. For example, a method may be employed in which a monomer that leads to the structural unit (I) is copolymerized in the polymerization of ethylene with a vinyl ester. Examples of the monomer that leads to the structural unit (I) include: alkenes such as propylene, butylene, pentene and hexene; and alkenes having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, propylene, 3-acyloxy-1-propene, 3-acyloxy-1-butene, 4-acyloxy-1-butene and 3,4-diacetoxy-1-butene are preferred in light of reactivity for copolymerization and the gas barrier properties of the laminate obtained. The alkene having an ester leads to the structural unit (I) during the saponification reaction.

In the above structural unit (II), it is preferred that $R^4$ and $R^5$ both represent a hydrogen atom. In particular, it is more preferred that $R^4$ and $R^5$ both represent a hydrogen atom, one of $R^6$ and $R^7$ represents an aliphatic hydrocarbon group having 1 to 10 carbon atoms, and the other of $R^6$ and $R^7$ represents a hydrogen atom. The aliphatic hydrocarbon group is preferably an alkyl group or an alkenyl group. In light of particular importance of the gas barrier properties of the laminate, it is particularly preferred that one of $R^6$ and $R^7$ represents a methyl group or an ethyl group, and the other represents a hydrogen atom. Alternatively, it is also particularly preferred that one of $R^6$ and $R^7$ represents a substituent represented by $(CH_2)_hOH$ (where h is an integer of 1 to 8), and the other represents a hydrogen atom. In the substituent represented by $(CH_2)_hOH$, h is preferably an integer of 1 to 4, more preferably 1 or 2, and particularly preferably 1.

The method for allowing EVOH to include the structural unit (II) is not particularly limited. For example, a method may be employed in which EVOH obtained by a saponification reaction is allowed to react with a monovalent epoxy compound such that the structural unit (II) is included in the EVOH. As the monovalent epoxy compound, a compound represented by one of the following formulae (IV) to (X) is suitably used.

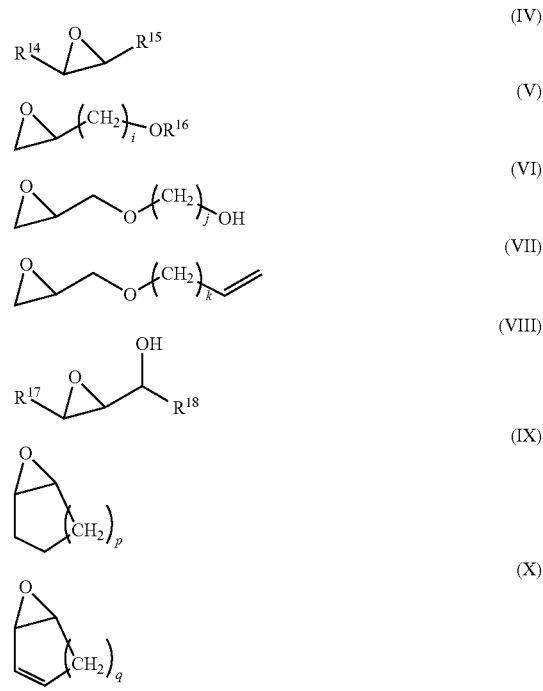

In the above formulae (IV) to (X), $R^{14}$, $R^{15}$, $R^{16}$, $R^{17}$ each independently represent a hydrogen atom, an aliphatic hydrocarbon group (such as an alkyl group or an alkenyl group) having 1 to 10 carbon atoms, an alicyclic hydrocarbon group (such as a cycloalkyl group or a cycloalkenyl group) having 3 to 10 carbon atoms, or an aliphatic hydrocarbon group (such as a phenyl group) having 6 to 10 carbon atoms; and i, j, k, p and q are each independently an integer of 1 to 8.

Examples of the monovalent epoxy compound represented by the above formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-propane, 3-phenyl-1,2-epoxypropane, and the like. Examples of the monovalent epoxy compound represented by the above formula (V) include various types of alkyl glycidyl ethers. Examples of the monovalent epoxy compound represented by the above formula (VI) include various types of alkylene glycol monoglycidyl ethers. Examples of the monovalent epoxy compound represented by the above formula (VII) include various types of alkenyl glycidyl ethers. Examples of the monovalent epoxy compound represented by the above formula (VIII) include various types of epoxy alkanols such as glycidol. Examples of the monovalent epoxy compound represented by the above formula (IX) include various types of epoxy cycloalkanes. Examples of the monovalent epoxy compound represented by the above formula (X) include various types of epoxy cycloalkenes.

Among the monovalent epoxy compounds described above, epoxy compounds having 2 to 8 carbon atoms are preferred. In particular, the monovalent epoxy compound more preferably has 2 to 6 atoms, and still more preferably has 2 to 4 carbon atoms, in light of ease in handling the compound and in light of reactivity. Among the monovalent epoxy compounds represented by the above formulae, the compound represented by the formula (IV) and the compound represented by the formula (V) are particularly preferred. Specifically, in light of reactivity with EVOH and the gas barrier properties of the laminate obtained, 1,2-epoxybutane, 2,3-epoxybutane, epoxypropane, epoxyethane and glycidol are preferred, and epoxypropane and glycidol are particularly preferred of these.

In the structural unit (III), $R^8$, $R^9$, $R^{10}$ and $R^{11}$ each preferably represent a hydrogen atom or an aliphatic hydrocarbon group having 1 to 5 carbon atoms. In particular, the aliphatic hydrocarbon group is preferably a methyl group, an ethyl group, a n-propyl group, an isopropyl group, a n-butyl group, an isobutyl group, a tert-butyl group or a pentyl group.

The method for allowing EVOH to include the structural unit (III) is not particularly limited. For example, such EVOH may be produced by using the method described in Japanese Unexamined Patent Application, Publication No. 2014-034647.

Depending on embodiments, the polymer for forming the A layer (the material for forming the A layer) may contain one or a plurality of types of additives such as a phosphate compound, a carboxylic acid, a boron compound and a metal salt. When the polymer for forming the A layer contains these additives, various performances of the laminate can be improved.

The polymer for forming the A layer may be constituted of the gas barrier resin alone or may contain a resin other than the gas barrier resin. The A layer (the material for forming the A layer) may contain, in addition to the polymer, a variety of components such as a heat stabilizer, an ultraviolet ray absorbing agent, an antioxidant, a colorant and a filler.

B Layer

The B layer is formed from a polymer, and the polymer includes an elastomer. In other words, the B layer is a layer formed from a polymer including an elastomer. Owing to having the B layer formed from a polymer including an elastomer, the laminate is capable of exhibiting favorable stretchability, flex resistance, thermoformability and the like.

The elastomer is a polymer that is a principal component of the B layer. The lower limit of the content of the elastomer in the B layer (a material for forming the B layer) is, for example, 60% by mass, preferably 90% by mass, more preferably 95% by mass and still more preferably 97% by mass, and may be even more preferably 99% by mass and further more preferably 99.9% by mass. The elastomer as referred to means a resin having elasticity at around normal temperature, and specifically, the elastomer as referred to herein is the resin characterized in that after being stretched to gain a twofold increase in length under a condition at a room temperature (20° C.) and maintained as it is for 1 minute, it contracts to be less than 1.5 times longer than its original length within 1 minute. Structurally, the elastomer is typically a polymer having a hard segment and a soft segment in its polymer chain. In general, the elastomer is thermoplastic.

Examples of the elastomer include styrene elastomers, olefin elastomers, diene elastomers, vinyl chloride elastomers, chlorinated polyethylene elastomers, polyurethane elastomers, polyester elastomers, polyamide elastomers and fluoro resin elastomers, and the like.

B1 Layer

The B1 layer is one type of the B layer (elastomer layer). The B1 layer is formed from a polymer, and the polymer includes a styrene elastomer as the elastomer. In other words, the B1 layer is formed from a polymer including a styrene elastomer. The lower limit of the content of the styrene elastomer in the B1 layer (a material for forming the B1 layer) is, for example, 60% by mass, preferably 90% by mass, more preferably 95% by mass and still more preferably 97% by mass, and may be even more preferably 99% by mass and further more preferably 99.9% by mass.

The lower limit of the iodine value of the polymer (entirety of the styrene elastomer and other arbitrary polymer) that forms the B1 layer is typically 200, preferably 220, and more preferably 230. Meanwhile, the upper limit of the iodine value is typically 300, preferably 280, and more preferably 260.

The iodine value as referred to herein means a mass (g) of iodine that can be added to 100 g of a target polymer, and is a marker indicating an amount of double bond(s) in the polymer. Since the polymer in the B1 layer configuring at least one outermost layer has sufficient double bond(s) in the laminate, a sufficient crosslinking reaction is caused in thermally bonding to a rubber material, whereby the laminate can be favorably adhered to the rubber material. Furthermore, when the iodine value of the polymer of the B1 layer is equal to or less than the upper limit, a sufficient amount of a functional group can be introduced into the styrene elastomer. Due to including the functional group or the like, the B1 layer can be favorably adhered to not only the rubber material but also other layer (for example, A layer and/or B2 layer), and thus also the laminate may exhibit superior interlayer adhesiveness.

It is to be noted that the iodine value means a value determined by the following iodometric titration. First, an appropriate amount (about 0.1 g to 1 g) of a target polymer is accurately weighed in a flask, to which 100 mL of chloroform is added, and complete dissolution is allowed. Next, 20 mL of Wijs' solution (0.1 N iodine monochloride-acetic acid solution) is added thereto, and the mixture is gently mixed by shaking and left to stand with shading of light at room temperature for 30 min. After 20 mL of 0.1 g/mL aqueous potassium iodide solution and 100 mL of water are added to this solution, the amount of released iodine is back titrated with 0.1 N aqueous sodium thiosulfate solution, and the iodine value (I: g/100 g) is determined according to the following formula. In this process, an end point of back titration with a 1 N aqueous sodium thiosulfate solution is decided through a visual observation of a water phase and a chloroform phase, as a point at which both phases are colorless. It is to be noted that a blank value is decided through a similar operation carried out without adding the polymer, as a titer (mL) of the 0.1 N aqueous sodium thiosulfate solution.

$$I=(B-C)\times f\times 1.269/S$$

I: iodine value (g/100 g)

S: mass (g) of a hydrogenated block copolymer (a) weighed

B: blank titer (mL) of the 0.1 N aqueous sodium thiosulfate solution

C: titer (mL) of the 0.1 N aqueous sodium thiosulfate solution f: factor of the 0.1 N aqueous sodium thiosulfate solution A procedure for controlling the iodine value to fall within a desired range, any procedure ordinarily conducted by a person skilled in the art may be employed. Examples of the procedure include: appropriately adjusting reaction conditions in polymerizing the styrene elastomer, such as a reaction temperature and a reaction time period; subjecting the styrene elastomer to a hydrogenation reaction; subjecting the styrene elastomer to modification such as epoxy-modification, as described later; mixing a plurality of styrene elastomers having different iodine values; mixing a styrene elastomer having a certain iodine value with other elastomer or other polymer; and the like.

The styrene elastomer has an aromatic vinyl based polymer block (hard segment) and a rubber block (soft segment). The aromatic vinyl based polymer moiety serves as a bridging point through formation of physical crosslinking, whereas the rubber block imparts rubber elasticity.

Examples of the styrene elastomer include styrene-butadiene-styrene block copolymers (SBS), styrene-isoprene-styrene block copolymers (SIS), styrene-isobutylene-styrene block copolymers (SIBS), styrene-ethylene/butylene-styrene block copolymers (SEBS), styrene-ethylene/propylene-styrene block copolymers (SEPS), polymers obtained by degeneration of these copolymers, and the like.

Among these styrene elastomers, at least one of SBS, SIS and SEBS is preferably used, and at least one of SBS and SIS is more preferably used. Also, as the styrene elastomer, unhydrogenated one is preferred. The unhydrogenated styrene elastomer has a sufficient amount of double bonds, thereby capable of making the adhesiveness to the rubber material to be more favorable. On the other hand, depending on the applications, etc., a resin composition that decreases the adhesiveness may be provided. For example, a composition may be also prepared which decreases the iodine value through adding SEBS, etc., to SBS and/or SIS.

The styrene elastomer preferably includes a functional group. Particularly, including a group that reacts with a group included in the other layer (the A layer, the B2 layer) to form a bond is preferred. Examples of the group included in the other layer include a hydroxyl group of EVOH, a group of the other elastomer such as TPU (e.g., a carbamate group, an isocyanate group, etc.), and the like. Examples of the functional group preferred include a carboxy group, an epoxy group, an amino group, and the like. Of these, a carboxy group and an epoxy group are more preferred, and an epoxy group is still more preferred. The styrene elastomer preferably has an epoxy group in the main chain. The expression that "has an epoxy group in the main chain" means that a cyclic ether structure is included in the main chain, and the styrene elastomer preferably has a three-membered cyclic ether structure in the main chain Such a styrene elastomer having a functional group can enhance the adhesiveness to the other A layer and/or B2 layer due to the presence of the functional group, and thus the interlayer adhesiveness of the laminate can be more enhanced.

The styrene elastomer having a carboxy group (carboxylic acid-modified styrene elastomer) can be obtained by, for example, (1) chemically bonding an unsaturated carboxylic acid or an anhydride thereof to a styrene elastomer through an addition reaction or a graft reaction, or (2) copolymerizing an aromatic vinyl compound with: a conjugated diene compound/or a hydrogenated product thereof; and an unsaturated carboxylic acid or an anhydride thereof, etc. Examples of the unsaturated carboxylic acid and an anhydride thereof include maleic acid, maleic anhydride, and the like.

The styrene elastomer having an epoxy group in the main chain (epoxy-modified styrene elastomer) can be obtained by, for example, allowing a styrene elastomer or a partially hydrogenated styrene elastomer to react with an epoxidizing agent in an inert solvent. The reaction with the epoxidizing agent causes epoxidation of a carbon-carbon double bond of the rubber block (soft segment).

The epoxidizing agent is exemplified by peracids, hydroperoxides and the like. Examples of the peracids include performic acid, peracetic acid, perbenzoic acid, trifluoro peracetic acid, and the like. Examples of the hydroperoxides include hydrogen peroxide, tert-butyl hydroperoxide, cumene hydroperoxide, and the like.

In the polymer that forms the B1 layer, a functional group such as an epoxy group may be included in other polymer and/or in other elastomer than the styrene elastomer. The lower limit of the content of the functional group (preferably, an epoxy group) in the polymer that forms the B1 layer is preferably 0.001 mmol/g, more preferably 0.1 mmol/g, still more preferably 0.2 mmol/g, even more preferably 0.3 mmol/g, and particularly preferably 0.5 mmol/g. Meanwhile, the upper limit is preferably 2 mmol/g, and more preferably 1.5 mmol/g. When the content of the epoxy group, etc., is less than the lower limit, sufficient interlayer adhesiveness may not be exhibited. Meanwhile, when the content of the epoxy group, etc., is greater than the upper limit, the introduction of such a group results in a decrease in double bonds included in the styrene elastomer, etc., whereby the adhesiveness to the rubber material may be decreased.

The content of the functional group such as the epoxy group and the carboxy group may be determined by a variety of a titration method. Specifically, in the case of the epoxy group, the content may be calculated from a reciprocal number of an epoxy equivalent determined in accordance with JIS K 7236. In the case of the carboxy group, the content may be calculated by: dissolving a sample in a xylene solvent; titrating the solution with a 0.1 N potassium hydroxide in alcohol (prepared by adding 5 g of ion exchanged water to 7 g of potassium hydroxide, and further adding primary ethyl alcohol up to a final mixture volume of 1 L, and then standardizing the titer (F) with a 0.1 N hydrochloric acid and 1% phenolphthalein solution); determining an acid value according to the following equation, from the amount of neutralization, through dividing the acid value by the molecular weight of potassium hydroxide.

$$\text{acid value (mg KOH/g)} = (\text{KOH titer (ml)} \times F \times 56.1) / \text{sample (mg)}$$

The polymer that forms the B1 layer may be either constituted from only the styrene elastomer, or contain other polymer such as an elastomer other than the styrene elastomer. Furthermore, the B1 layer (a material for forming the B1 layer) may further contain, in addition to the polymer, other components such as a heat stabilizer, an ultraviolet ray-absorbing agent, an antioxidant, a colorant, a filler, a vulcanization accelerator and a vulcanization acceleration aid.

Also, the polymer that forms the B1 layer preferably does not contain a tackiness imparting agent in an amount of more than 20 parts by mass with respect to 100 parts by mass of the styrene elastomer, in light of production stability and handleability. Examples of the tackiness imparting agent include tackifiers, such as a terpene resin, a terpenephenol resin, an aromatic terpene resin and a rhodine ester resin, and the like. When the polymer that forms the B1 layer contains the tackiness imparting agent, the upper limit of the content with respect to 100 parts by mass of the styrene elastomer is preferably 20 parts by mass, more preferably 15 parts by mass, still more preferably 10 parts by mass, and particularly preferably 5 parts by mass. It is most preferred that the polymer that forms the B1 layer does not contain any tackiness imparting agent. The content of the tackiness imparting agent included in the polymer that forms the B1 layer is preferably 20 parts by mass or less, from the perspective that the production stability and handling characteristics of the multilayered structure may be improved.

B2 Layer

The B2 layer is one type of the B layer (elastomer layer), and is a layer other than the B1 layer described above. The B2 layer is formed from a polymer including an elastomer other than the elastomer that forms the B1 layer. The elastomer included in the polymer that forms the B2 layer is typically a thermoplastic elastomer, and specific examples include an olefin elastomer, a diene elastomer, a vinyl chloride elastomer, a chlorinated polyethylene elastomer, a polyester elastomer, a polyamide elastomer, a fluorocarbon resin elastomer, a polyurethane elastomer, and the like. Of these, the polyurethane elastomer is preferred. By using the polyurethane elastomer, the flex resistance and the like can be more enhanced. These elastomers may be used alone of one type, or as a mixture of two or more types thereof. The lower limit of the content of the elastomer in the B2 layer (a material for forming the B2 layer) is, for example, 60% by mass, preferably 90% by mass, more preferably 95% by mass and still more preferably 97% by mass, and may be even more preferably 99% by mass and further more preferably 99.9% by mass.

The olefin elastomer is exemplified by: thermoplastic elastomers in which a polyolefin moiety such as polypropylene or polyethylene is included as a hard segment and an ethylene-propylene-diene copolymerized rubber moiety or the like is included as a soft segment; a maleic anhydride-modified ethylene-butene-1 copolymer, a maleic anhydride-modified ethylene-propylene copolymer, a halogenated butyl rubber, modified polypropylene, modified polyethylene, and the like.

Examples of the diene elastomer include a 1,2-polybutadiene elastomer, a trans-1,4-polyisoprene elastomer, a hydrogenated conjugated diene elastomer, epoxidized natural rubber, modified products of these with maleic anhydride, and the like.

There are, in general, three types of vinyl chloride elastomers listed below. The vinyl chloride elastomer may be a modified product such as a maleic anhydride-modified elastomer.
(1) high-molecular weight polyvinyl chloride (PVC)/plasticized PVC blend type
(2) partially crosslinked PVC/plasticized PVC blend type
(3) PVC/elastomer alloy type The chlorinated polyethylene elastomer is a soft resin obtained by allowing polyethylene in the form of an aqueous suspension liquid or in a solvent such as carbon tetrachloride to react with a chlorine gas. The chlorinated polyethylene elastomer includes crystalline polyethylene moiety as a hard segment and a chlorinated polyethylene moiety as a soft segment.

The polyester elastomer is a multi-block copolymer that includes in the molecule, a polyester moiety as a hard segment, and a polyether moiety or a polyester moiety having a low glass transition temperature (Tg) as a soft segment.

The polyamide elastomer is a multi-block copolymer that includes a polyamide moiety as a hard segment, and a polyether moiety or a polyester moiety having a low Tg as a soft segment. The polyamide component is selected from nylons 6, 66, 610, 11, 12, etc., and is typically nylon 6 or nylon 12. As a material for constituting the soft segment, a long chain polyol such as polyether diol or polyester diol may be used. Examples of the polyether include poly(oxotetramethylene) glycol (PTMG), poly(oxypropylene) glycol, and the like. Examples of the polyesterdiol include poly(ethylene adipate)glycol, poly(butylene-1,4-adipate) glycol, and the like.

The fluoro resin elastomer is an ABA type block copolymer composed of a fluoro resin moiety as a hard segment and a fluororubber moiety as a soft segment. The fluoro resin used for the hard segment may be a tetrafluoroethylene-ethylene copolymerized polymer, polyvinylidene fluoride (PVDF) or the like. The fluororubber used for the soft segment may be a vinylidene fluoride-hexafluoropropylene-tetrafluoroethylene ternary copolymerized polymer or the like.

The polyurethane elastomer (thermoplastic polyurethane elastomer (TPU)) is, for example, a linear multi-block copolymer that includes (1) as a hard segment, a polyurethane moiety obtained by a reaction of a short chain glycol (low-molecular weight polyol) with an isocyanate, and (2) as a soft segment, a polyurethane obtained by a reaction of a long chain glycol (high-molecular weight polyol) with an isocyanate. The "polyurethane" is a generic name of compounds having a urethane bond (—NHCOO—) obtained by a polyaddition reaction (urethanating reaction) of isocyanate (—NCO) with an alcohol (—OH).

The polyurethane elastomer is preferably used as the polymer from which the B2 layer is formed, in light of the advantage that the stretchability, the thermoformability and the like can be improved. Owing to, for example, the strong adhesiveness between the B2 layer and the A layer, the laminate is capable of exhibiting favorable flex resistance and the like.

TPU is constituted from a high-molecular weight polyol, an organic polyisocyanate, a chain extender, and the like. The high-molecular weight polyol is a substance having a plurality of hydroxyl groups, and may be obtained by polycondensation, addition polymerization (e.g., ring-opening polymerization), polyaddition, or the like. The high-molecular weight polyol is exemplified by a polyester polyol, a polyether polyol, a polycarbonate polyol, condensates thereof (e.g., a polyester-ether-polyol), and the like. The high-molecular weight polyol may be used either alone, or as a mixture of two or more types thereof. Of these, a polyester polyol and a polycarbonate polyol are preferred, and a polyester polyol is particularly preferred.

The polyester polyol may be produced, for example, according to a conventional method, by allowing an ester-formable derivative such as a dicarboxylic acid, an ester thereof or an anhydride thereof to be condensed with a low-molecular weight polyol by way of a direct esterification reaction or a transesterification reaction, or by subjecting a lactone to ring-opening polymerization.

Examples of the polyether polyol include polyethylene glycol, polypropylene glycol, polytetramethylene glycol, poly(methyltetramethylene)glycol, and the like. The polyether polyol may be used either alone, or as a mixture of two or more types thereof. Of these, polytetramethylene glycol is preferred.

As the polycarbonate polyol, for example, a substance obtained by condensation polymerization of an aliphatic diol having 2 to 12 carbon atoms (e.g., 1,4-butanediol, 1,5-pentanediol, 1,6-hexanediol, 1,8-octanediol, 1,10-decanediol) or a mixture of these with diphenyl carbonate, phosgene or the like may be suitably used.

The lower limit of the number average molecular weight of the high-molecular weight polyol is preferably 500, more preferably 600, and still more preferably 700. The upper limit of the number average molecular weight of the high-molecular weight polyol is preferably 8,000, more preferably 5,000, and still more preferably 3,000. When the number average molecular weight of the high-molecular weight polyol is less than the lower limit, miscibility with the organic polyisocyanate may be so high that the resulting TPU can have inferior resilience, whereby mechanical characteristics such as stretchability and thermoformability of the laminate obtained may be deteriorated. When the number average molecular weight of the high-molecular weight polyol is greater than the upper limit, miscibility with the organic polyisocyanate may be lowered, making it difficult to perform mixing in the polymerization procedure. As a result, TPU may not be produced stably due to generation of blocks of gelatinous matter, and the like. It is to be noted that the number average molecular weight of the high-molecular weight polyol is determined by a measurement in accordance with JIS K 1577 and calculation based on the hydroxyl value.

The organic polyisocyanate is not particularly limited, and well-known organic diisocyanate commonly employed in the production of TPU may be used. Examples of the organic diisocyanate include: aromatic diisocyanates such as 4,4'-diphenylmethanediisocyanate, tolylenediisocyanate, phenylenediisocyanate, xylylenediisocyanate, 1,5-naphthalenediisocyanate, 3,3'-dichloro-4,4'-diphenylmethanediisocyanate and tolylenediisocyanate; aliphatic diisocyanates (inclusive of alicyclic diisocyanates) such as hexamethylenediisocyanate, isophoronediisocyanate, 4,4'-dicyclohexylmethanediisocyanate and hydrogenated xylylenediisocyanate; and the like. Among these, 4,4'-diphenylmethanediisocyanate is preferred in light of the advantage that the strength and flex resistance of the laminate obtained can be improved. The organic diisocyanate may be used either alone, or in combination of two or more types thereof.

As the chain extender, any chain extender commonly employed in the production of TPU may be used, and a low-molecular weight compound having two or more active hydrogen atoms that can react with an isocyanate group in the molecule and having a molecular weight of 300 or less is suitably used. Examples of the chain extender include ethylene glycol, propylene glycol, 1,4-butanediol, 1,6-hexanediol, 1,4-bis(β-hydroxyethoxy)benzene 1,4-cyclohexanediol, and the like. Among these, an aliphatic diol having 2 to 10 carbon atoms is preferred, and 1,4-butanediol is particularly preferred, in light of the advantage that the stretchability and thermoformability of the laminate obtained can be more favorable. The chain extender may be used either alone, or as a mixture of two or more types thereof.

As to the method for producing TPU, the high-molecular weight polyol, the organic polyisocyanate and the chain extender described above are used and a well-known urethanating reaction technique is employed. Either the prepolymer method or the one-shot method may be used for the production. Specifically, melt polymerization conducted substantially in the absence of a solvent is preferred, and continuous melt polymerization conducted through the use of a multi-screw extruder is particularly preferred.

The polymer for forming the B layer may contain only the elastomer, or may contain a polymer other than the elastomer. The B layer (the material for forming the B layer) may contain, in addition to the polymer, components such as a heat stabilizer, an ultraviolet ray absorbing agent, an antioxidant, a colorant and a filler.

Applications, etc.

Due to having the gas barrier layer (A) and the elastomer layer (B), the laminate of the embodiment of the present invention is superior in gas barrier properties, stretchability and the like, and the adhesive layer (B1) serving as the outermost layer is capable of favorably adhering to a rubber material through a crosslinking reaction. In addition, the laminate is also superior in interlayer adhesiveness, flex resistance and the like. Therefore, the laminate can be used as a food packaging material, a container packaging material for medical practice, other container packaging material, a sheet material for industrial use, etc., and as a sheet material for architectural use, a sheet material for agriculture, a geomembrane, a radon barrier film, other sheet materials, as well as other various types of pipe, and the like. In particular, due to having favorable adhesiveness to the rubber material as described above, the laminate can be suitably used as an inner package of an accumulator, an inflated ball, an air spring or the like, as well as a gas barrier film laminated on a filmy rubber product, etc.

Method for Producing Laminate

The method for producing the laminate of the present embodiment is not particularly limited as long as the A layer and the B layer can be favorably laminated and adhere to each other, and a well-known method such as coextrusion, pasting, coating, bonding or attaching may be employed.

The laminate may be produced by a production method preferably including coextruding the polymer for forming the A layer (the material for forming the A layer) and the polymer for forming the B layer (the material for forming the B layer). Such a production method enables the adhesive layer (B1), which includes the outermost layer and has favorable adhesiveness to the rubber material, to be formed simultaneously with other layers, and thus is superior in productivity and the like.

According to the multilayer coextrusion process, the laminate is formed by a process including: heating to melt the polymer for forming the A layer and the polymer for forming the B layer; feeding the polymers with extruders and/or pumps to extrusion dies through their respective flow paths; extruding the polymers into multiple layers, from the extrusion dies; and thereafter laminating by adhesion. As the extrusion die, for example, a multimanifold die, a field block, a static mixer, or the like may be used.

The melt viscosity ratio is preferably as specified below in relation to the viscosity of each of the polymers for forming the A layer and the B layer. The lower limit of the ratio ($\eta_B/\eta_A$) of the viscosity of the polymer for forming the B layer ($\eta_B$) to the viscosity of the polymer for forming the A layer ($\eta_A$) at a temperature of 210° C. and at a share rate of 1,000/sec is preferably 0.3, and more preferably 0.5. The upper limit of the melt viscosity ratio ($\eta_B/\eta_A$) is preferably 2, and more preferably 1.5. When the melt viscosity ratio ($\eta_{1B}/\eta_A$) falls with the above range, a favorable external appearance may be provided in forming the laminate by multilayer coextrusion, and favorable adhesion between the A layer and the B layer may be provided, whereby the durability and the like of the laminate can be improved.

The method for producing a laminate of the present embodiment preferably includes irradiating with an electron beam, the structure (laminate) obtained after the coextrusion. Due to the irradiation with an electron beam, a crosslinking reaction occurs between layers, and thus the interlayer adhesive force of the laminate obtained can be enhanced. Various types of electron beam accelerators such as a Cockcroft-Walton accelerator, a Van de Graaff accelerator, a resonance transformer accelerator, an insulated core transformer accelerator, a Dynamitron accelerator and a high frequency accelerator may be used as an electron beam source.

Multilayered Structure

According to a further embodiment of the present invention, a multilayered structure includes: the laminate according to the embodiment of the present invention; and a diene rubber layer (C) (hereinafter, also referred to as "C layer") laminated on an outer surface of the adhesive layer (B1) having been laminated as the outermost layer of the laminate.

Figure 2:
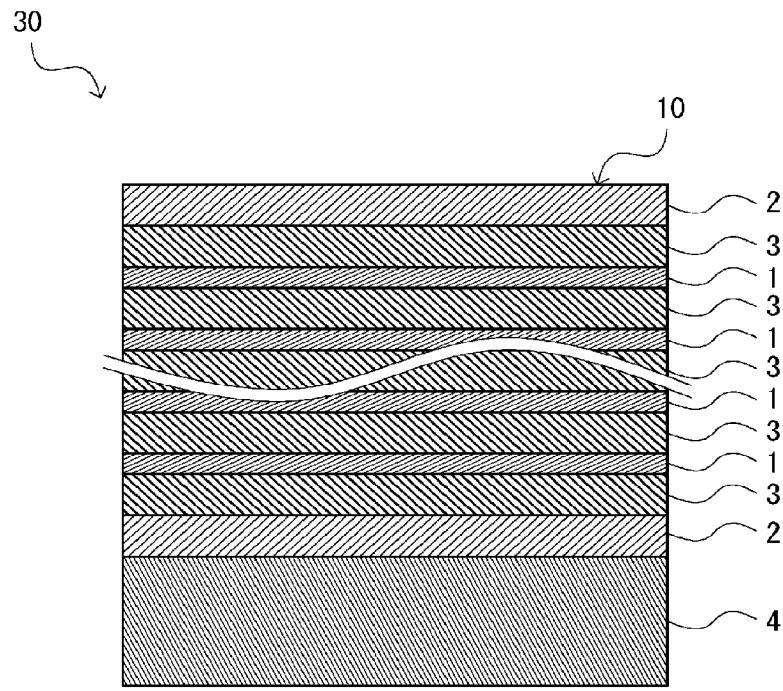
FIG. 2(a) is a schematic cross-sectional view of a multilayered structure that includes the laminate shown in FIG. 1(a).
FIG. 2(b) is a schematic cross-sectional view of a multilayered structure that includes the laminate shown in FIG. 1(b).
Figure 2:
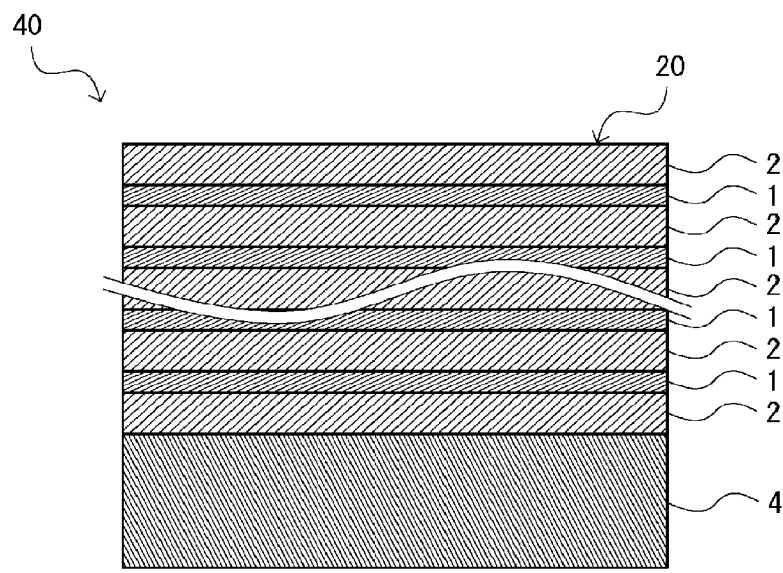

Examples of the multilayered structure having a preferred structure include a multilayered structure 30 shown in FIG. 2(*a*) and a multilayered structure 40 shown in FIG. 2(*b*). The multilayered structure 30 shown in FIG. 2(*a*) is obtained by laminating a C layer 4 on one outer face of the laminate 10 shown in FIG. 1(*a*). The multilayered structure 40 shown in FIG. 2(*b*) is obtained by laminating a C layer 4 on one outer face of the laminate 20 shown in FIG. 1(*b*). It is to be noted that the multilayered structure of the present embodiment may include the C layers laminated on the outer faces of the laminate on both sides. The multilayered structure according to the present embodiment may also include, for example, resin layers other than the A layers, the B layers and the C layers.

The laminate in the multilayered structure of the present embodiment, and each layer included in the laminate, i.e., the A layer and the B layer (B1 layer and B2 layer) are similar to those of the laminate described above.

The lower limit of the average thickness of the multilayered structure is preferably 50 μm, and more preferably 100 μm. Meanwhile, the upper limit is preferably 3 mm, more preferably 1,000 μm, still more preferably 750 μm, and particularly preferably 500 μm. When the average thickness of the multilayered structure is less than the lower limit, the strength, the flex resistance, the durability, the gas barrier properties and the like may be deteriorated. To the contrary, when the average thickness is greater than the upper limit, the flexibility, the formability, the lightweight properties and the like may be deteriorated, and a decrease in the flex resistance, as well as an increase in production cost may be caused.

The C layer is formed from a rubber material containing diene rubber. The diene rubber as referred to means rubber having carbon-carbon double bonds in the main chain Examples of the diene rubber includes natural rubber (NR), isoprene rubber (IR), cis-1,4-polybutadiene (BR), syndiotactic 1,2-polybutadiene (1,2-BR), styrene-butadiene copolymer rubber (SBR), acrylonitrile-butadiene rubber (NBR), chloroprene rubber (CR), butyl rubber (LIR) and the like. The diene rubber may be used either alone, or as a mixture of two or more types thereof.

Although the C layer may be formed from the diene rubber alone, the C layer may contain components other the diene rubber, within the range not leading to impairment of the effects of the present invention. Other components may be, for example, a softening agent, an anti-aging agent, a vulcanizing agent, a vulcanization accelerator, a vulcanization acceleration aid, a scorch retarder, zinc white, stearic acid, and a filler.

The average thickness of each one C layer is not particularly limited, and the lower limit thereof is preferably 10 μm, and more preferably 100 μm. Meanwhile, the upper limit is preferably 3 mm, more preferably 1 mm, and still more preferably 0.5 mm.

The C layer and the B1 layer adjacent to the C layer are bonded strongly to each other at the interface therebetween through a cross-linking reaction (vulcanization reaction). In particular, since the B1 layer is formed from a polymer including a styrene elastomer, etc., having sufficient double bond(s) in the main chain thereof, a satisfactory crosslinking reaction with a diene rubber is enabled. Meanwhile, when the styrene elastomer that forms the B1 layer has a functional group such as an epoxy group, a crosslinking reaction with a polymer that forms the layer on the inner face side (the A layer or the B1 layer) is also enabled. Therefore, the multilayered structure of the present embodiment is capable of exhibiting superior interlayer adhesiveness.

Owing to being superior in the gas barrier properties, stretchability, interlayer adhesiveness, flex resistance and the like, the multilayered structure can be suitably used for various types of films, membranes and the like for which the stretchability and the gas barrier properties are required. Specifically, the multilayered structure can be suitably used for a component material of, for example, an inner liner for a pneumatic tire, an inner package of an accumulator, an inflated ball, an air spring and the like.

Method for Producing Multilayered Structure

The multilayered structure can be suitably obtained by a production method including: coextruding a polymer for forming the A layer (the material for forming the A layer), and a polymer for forming the B layer (the material for forming the B layer); and thermally bonding the C layer to a structure (laminate) obtained after the coextrusion.

The coextruding is similar to the coextrusion described in connection with the method for producing a laminate of the aforementioned embodiment. The thermally bonding may be carried out by laminating and heating the C layer (diene rubber film) and the B1 layer having been provided as the outermost layer of the structure (laminate) obtained through the coextrusion. The heating causes vulcanization between the B1 layer and the C layer, whereby strong adhesion occurs. The lower limit of the heating temperature in this step is preferably 120° C., more preferably 125° C., and still more preferably 130° C. Meanwhile, the upper limit of the heating temperature is preferably 200° C., more preferably 190° C., and still more preferably 180° C.

It is preferred that before the thermally bonding, the method further includes irradiating with an electron beam, the structure (laminate) obtained after the coextrusion. By thus irradiating with an electron beam, a crosslinking reaction is caused between the A layer and the B layer (the B1 layer or the B2 layer), as well as between the B1 layer and the B2 layer, whereby the interlayer adhesive force, the durability and the like of the resulting multilayered structure can be more enhanced. The irradiation with an electron beam may be carried out similarly to the irradiation described in connection with the method for producing a laminate.

The laminate, the multilayered structure and the method for producing these of the present invention are not limited to the embodiments described in the foregoing. For example, the laminate may include other layer in addition to the A layer and the B layer, and the multilayered structure may include other layer in addition to the A layer, the B layer and the C layer. Alternatively, a layer structure in which the A layer is provided as one of the outermost layers may be provided, and a support film or the like may be further laminated on one of the outer surfaces, etc., of the laminate and/or the multilayered structure. The support film is not particularly limited, which may not be a resin layer, and for example, a general synthetic resin layer, a synthetic resin film or the like may be also employed. Furthermore, lamination means of the support layer is not particularly limited, and adhesion with an adhesive, extrusion lamination or the like may be employed.

EXAMPLES

Hereinafter, the embodiments of the present invention will be described more specifically by way of Examples, but the present invention should not be construed as being limited to the following Examples.

Production Example 1: Production of EVOH (1) (Epoxybutane-Modified EVOH)

Into a polymerization reactor equipped with a cooling device and a stirrer were charged 20,000 parts by mass of vinyl acetate, 2,000 parts by mass of methanol and, as a polymerization initiator, 10 parts by mass of 2,2'-azobis-(4-methoxy-2,4-dimethylvaleronitrile). While the resulting mixture was stirred, nitrogen replacement was carried out, and thereafter ethylene was introduced into the polymerization reactor, with the inner temperature adjusted to 60° C. and the ethylene pressure adjusted to 45 kg/cm$^2$. While the same temperature and the same pressure were maintained, the resulting mixture was stirred for 4 hours to allow polymerization. Next, sorbic acid (SA) in an amount of 10 parts by mass (0.05% by mass with respect to vinyl acetate charged) was dissolved in methanol to prepare a 1.5% by mass solution, which was added to the polymerization reactor. The degree of polymerization was 45% with respect to vinyl acetate charged. The resulting copolymerization reaction liquid was fed to a separation column. After unreacted vinyl acetate was eliminated from the top of the column by introduction of methanol vapor from the bottom of the column, a 40% methanol solution of the copolymer was obtained. The copolymer had an ethylene unit content of 32 mol % and a vinyl acetate unit content of 68 mol %.

The methanol solution of the copolymer was introduced into a saponification reaction vessel, and then a solution of sodium hydroxide/methanol (85 g/L) was added so as to attain 0.5 equivalents with respect to the vinyl acetate component in the copolymer. Thereto was further added methanol to attain a copolymer concentration of 15% by mass. The temperature in the reaction vessel was elevated to 60° C., and the reaction was allowed to proceed for 5 hours while nitrogen gas was blown into the reactor. Thereafter, the reaction liquid was neutralized with acetic acid to stop the reaction, and the content was taken out from the reaction vessel and was left to stand at normal temperature, whereby precipitation as a particulate matter was permitted. By using a centrifugal separator, the precipitated particles were subjected to deliquoring, and then an operation including addition of a large amount of water and subsequent deliquoring was repeated. Thereafter, drying gave unmodified EVOH having a degree of saponification of 99.9 mol % or greater.

The resultant unmodified EVOH was treated with an aqueous solution containing acetic acid and sodium hydrogen phosphate (0.05 g of acetic acid and 0.02 g of sodium hydrogen phosphate in 1 L of the aqueous solution) at a liquor ratio of 20, and then dried, whereby EVOH composition particles were obtained. The EVOH composition particles had an acetic acid content of 40 ppm, and a phosphorous compound content of 20 ppm in terms of phosphate radical equivalent.

Through the use of a biaxial extruder "TEM-35BS" (37 mmφ, L/D=52.5) manufactured by Toshiba Machine Co., Ltd., for the resultant EVOH composition particles, epoxybutane was allowed to react therewith in the presence of an added catalyst. Unreacted epoxybutane was eliminated through a vent, and then an 8.2% by mass aqueous ethylenediamine tetraacetate trisodium hydrate solution was added as a catalyst quencher to permit pelletization. Thereafter, drying gave pellets of EVOH (1) having an ethylene unit content of 32 mol %. Further, the degree of modification with epoxybutane was 5.8 mol % as determined by $^1$H-NMR (internal standard substance: tetramethylsilane, solvent: $d_6$-DMSO).

Production Example 2: Production of EVOH (2) (Unmodified EVOH)

By a similar method to that of Production Example 1 except that modification with epoxybutane was not carried out, pellets of unmodified EVOH (2) having the ethylene unit content of 32 mol % and the degree of saponification of 99.9 mol % or greater were obtained.

Production Example 3: EVOH (3)

Through carrying out the extrusion under a similar condition to that of Production Example 1 except that epoxypropane was used in place of epoxybutane, modified EVOH (3) having the ethylene unit content of 32 mol %, the degree of saponification of 99.9 mol % or greater and the degree of modification with epoxypropane of 8.0 mol % was obtained.

Production Example 4: EVOH (4)

Through carrying out the extrusion under a similar condition to that of Production Example 1 except that glycidol was used in place of epoxybutane, modified EVOH (4) having the ethylene unit content of 32 mol %, the degree of saponification of 99.9 mol % or greater and the degree of modification with glycidol of 5.0 mol % was obtained.

Production Example 5: Production of EVOH (5) (MPDAc-Modified EVOH)

Into a polymerization reactor equipped with a cooling device and a stirrer were charged 21,000 parts by mass of vinyl acetate, 2,100 parts by mass of methanol (hereinafter, referred to as MeOH), 1,100 parts by mass of 2-methylene-1,3-propanedioldiacetate (hereinafter, referred to as MPDAc). After the temperature of the mixture was elevated to 60° C., nitrogen replacement was carried out. Thereafter, ethylene was introduced into the polymerization reactor, with the inner temperature adjusted to 60° C. and the ethylene pressure adjusted to 43 kg/cm$^2$. As a polymerization initiator, 16.8 parts by mass of 2,2'-azobis (2,4-dimethylvaleronitrile) were added in a methanol solution. While the same temperature and the same pressure were maintained, the resulting mixture was stirred for 4.5 hours to allow polymerization, followed by cooling to stop the polymerization. The degree of polymerization was 34% with respect to vinyl acetate charged. After the polymerization reactor was opened to remove ethylene, nitrogen gas was bubbled to complete the removal of ethylene. Then, after eliminating unreacted vinyl acetate under a reduced pressure, methanol was added to a modified ethylene-vinyl acetate copolymer that includes a structural unit derived from MPDAc having been introduced by copolymerization, whereby a 20% by mass methanol solution was prepared.

The methanol solution of the copolymer in an amount of 4,715 parts by mass was introduced into a saponification reaction vessel, and then a solution of sodium hydroxide/methanol (80 g/L) was added over 2 hours so as to attain 0.5 equivalents with respect to the vinyl acetate component in the copolymer. Thereafter, the temperature in the reaction vessel was maintained at 60° C., and the mixture was stirred for 2 hours to allow the reaction, followed by neutralization with acetic acid to stop the reaction. Next, methanol was allowed to flow outside the polymerization reactor by using ion exchanged water while the mixture was heated at 80° C. with stirring, whereby precipitation of a modified ethylene-vinyl alcohol copolymer (hereinafter, referred to as modified EVOH) was permitted. Particles obtained after the precipitation were ground with a mixer to give powder. By using a centrifugal separator, the obtained powder was subjected to deliquoring, and then an operation including addition of a large amount of water and subsequent deliquoring was repeated. Thereafter, drying gave 503 parts by mass of a dried matter of modified EVOH having the degree of saponification of 99.9 mol % or greater.

Into a stirring bath were charged 758 parts by mass of the dried matter of modified EVOH obtained by repeating the aforementioned operation twice, and further, 398 parts by mass of water and 739 parts by mass of methanol, and dissolution was allowed by elevating the temperature to 85° C. The solution was extruded into a mixture of water/methanol=90/10 having been cooled to 5° C. to allow deposition in a strand form. Further, cutting the deposits with a strand cutter into a pellet form gave hydrous pellets of modified EVOH having a moisture content of 55% by mass.

The resulting hydrous pellets of modified EVOH were washed by repeating a process including: washing with stirring using an aqueous solution containing acetic acid (1 g/L) at a liquor ratio of 20; and then deliquoring, whereby hydrous pellets of modified EVOH were obtained. The hydrous pellets were treated with acetic acid, sodium acetate and phosphoric acid (0.525 g of sodium acetate, 0.8 g of acetic acid and 0.007 g of phosphoric acid dissolved, in 1 L of the aqueous solution) at a liquor ratio of 20, and then dried to give pellets of EVOH (5) having an ethylene unit content of 32 mol %, and an MPDAc-modified unit content of 3.9 mol %. The EVOH composition particles had a sodium acetate content of 150 ppm in terms of sodium element equivalent, and a phosphoric acid content of 10 ppm in terms of phosphate radical equivalent.

Production Example 6: Production of TPU

Polytetramethylene ether glycol (PTMEG) having a number average molecular weight of 1,000, 1,4-butanediol (1,4-BD) and 4,4'-diphenylmethanediisocyanate (MDI) were continuously fed at a molar ratio of PTMEG: 1,4-BD: MDI=1.0:1.2:2.2 to an anterior part of a heating zone of a coaxially rotatable biaxial screw type extruder (30 mmφ, L/D=36; heating zone including subdivided three parts, i.e., anterior part, mid part and posterior part) such that the total feeding rate of the compounds was 200 g/min, and continuous melt polymerization was allowed at 260° C. The melt thus obtained was continuously extruded into water to give a strand form. Subsequently, the extruded strands were cut with a pelletizing machine, followed by drying for moisture absorption at 60° C. for 12 hours to give pellets of TPU. Thus obtained TPU had a melt viscosity of 1,080 Pa·s, and the outflow initiating temperature thereof was 171° C.

Resins and the like used in Examples and Comparative Examples are as in the following.
nylon 6: "AMILAN CM1021FS" (Toray Industries, Inc.)
nylon MXD6: "S6007" (Mitsubishi Gas Chemical Company)
polyglycolic acid (PGA): "Kuredux" manufactured by Kureha Corporation
epoxy-modified SBS (1) (E-SBS (1)): "EPOFRIEND AT501" (Daicel Corporation), (iodine value 239, amount of functional group 1 mmol/g)
epoxy-modified SBS (2) (E-SBS (2)): "EPOFRIEND CT310" (Daicel Corporation), (iodine value 249, amount of functional group 0.5 mmol/g)
maleic anhydride-modified SBS (MA-SBS): "TUFPRENE 912" (Asahi Kasei Chemicals Corporation), (iodine value: 266, amount of functional group: 0.06 mmol/g)
maleic anhydride-modified SEBS (MA-SEBS): "Tuftec M1943" (Asahi Kasei Chemicals Corporation), (iodine value: 10, amount of functional group: 0.02 mmol/g)
SBS: "Tufprene A" (Asahi Kasei Chemicals Corporation), (iodine value not determined)
SIS: "SIS5229" (JSR Corporation), (iodine value: 335)

The iodine value and the amount of functional group in each of the elastomers were determined according to the methods in the Description of Embodiments above. When prepared by mixing the elastomers for use, the determination was made on the mixture. The results of determination are shown in Table 1 to Table 3.

Furthermore, the following material was used in Examples and Comparative Examples.
natural rubber: TSR-20" (Chubu Osaka Rubber), (average thickness: 400 μm)

Example 1

EVOH (1), E-SBS (1) and TPU were used as materials, which were fed into a coextruder in a molten state at 190° C. with a 20-layer feedblock. The molten matter was casted to a cooling roller controlled at 50° C., and rolled to give a laminate having a 20-layer structure. It is to be noted that the coextrusion was conducted such that nine EVOH (1) layers and ten TPU layers were alternately laminated, and that an E-SBS (1) layer was laminated as one of the outermost layers. During continuous operation for 8 hours, the laminate was stably obtained without occurrence of any malfunction.

The laminate obtained as described above was observed in cross section with "DIGITAL MICROSCOPE VK-X200" (Keyence Corporation). As a result, the A layer (EVOH (1) layer) had the average thickness of 0.5 μm; the B1 layer (E-SBS (1) layer) had the average thickness of 5 μm; and the B2 layer (TPU layer) had the average thickness of 4.5 μm. It is to be noted that each thickness was an averaged value of measurements at randomly selected 10 points.

The B1 layer (E-SBS (1) layer) of thus obtained laminate was irradiated with an electron beam by using an electron beam irradiation apparatus "Curetron EBC200-100 for Production" (Nisshin High Voltage Co., Ltd.), under a condition involving an accelerating voltage of 200 kV, and an irradiation energy of 150 kGy. Thereafter, a natural rubber film (C layer) having an average thickness of 400 μm was placed on the surface of the laminate, and they were thermally bonded at a temperature of 160° C. for 15 min, whereby the multilayered structure of Example 1 was obtained.

Examples 2 to 26, Comparative Examples 1 to 5

The multilayered structures of Examples 2 to 26 and Comparative Examples 1 to 5 were each obtained in a similar manner to Example 1 except that the polymer employed, the lamination number of each layer, and the average thickness of each one layer were as shown in Tables 1 to 3. When two types of elastomers were used as a mixture in the polymer, the mixing ratio (mass ratio) is also shown together.

Evaluations

Each characteristic of the multilayered structure obtained was evaluated according to the method described below. The results of the evaluations of these characteristics are shown in Tables 1 to 3.

(1) Oxygen Permeation Rate

The obtained multilayered structure was subjected to humidity conditioning at 20° C. and 65% RH for 5 days. Two sample sheets of the multilayered structure after the conditioning were used to measure the oxygen permeation rate, with MOCON OX-TRAN2/20 model" (Modern Controls Inc.) under a condition at 20° C. and 65% RH, in accordance with the method prescribed in JIS K 7126-2 (equal pressure method; 2006), and the averaged value was determined (unit: mL/(m²·day·atm)). It is to be noted that the oxygen permeation rate being 300 mL/(m²·day·atm) or less suggests the amount of oxygen permeation corresponding to 300 mL or less per m² per day under a condition of 1 atmospheric pressure; therefore, the evaluation may be made as having the gas barrier properties.

(2) Interlayer Adhesive Force Between B1 Layer and C Layer

The obtained multilayered structure was subjected to humidity conditioning in an atmosphere at 23° C. and 50% RH for 7 days. Thereafter, a piece of strip having a width of 10 mm was produced in a machine direction (MD, drawing direction of film in forming) for use as a measurement sample. T type peel strength between the B1 layer (adhesive layer) and the C layer (diene rubber layer) of the measurement sample was measured by using an autograph "AGS-H model" (Shimadzu Corporation) in an atmosphere of 23° C. and 50% RH, at a strain rate of 250 mm/min. The measurement was evaluated according to the following criteria A to D. The adhesiveness may be evaluated as being superior in the case of falling under the criteria A to C.

A: 10 N/10 mm or greater;
B: 5 N/10 mm or greater and less than 10 N/10 mm;
C: 2.5 N/10 mm or greater and less than 5 N/10 mm; and
D: less than 2.5 N/10 mm.

(3) Pinhole Number after Bending

In accordance with ASTM-F392-74, bending was repeated 5,000 times using "BE1006 Gelvo type Flex-Cracking Tester with Chamber" manufactured by Tester Sangyo Co Ltd., in an environment of −30° C. The number of pinhole after bending was counted. It is to be noted that in the case where the pinhole number was 20 or less in a region of 210 mm×297 mm, the flex resistance may be evaluated as being favorable.

(4) Interlayer Adhesive Force Between B1 Layer and a Layer or B2 Layer

By a similar procedure to the measurement of (2) Interlayer Adhesive Force between B1 Layer and C Layer described above, T type peel strength between the B1 layer and the A layer or the B2 layer was measured. The measurement was evaluated according to the following criteria. It is to be noted that the interlayer adhesive force was measured with respect to the B1 layer being in contact with the C layer, and the measurement of the adhesive force was performed for the interlayer on the side opposite to the C layer. In other words, for Examples 5 and 18, Comparative Examples 4 and 5 not including the B2 layer (TPU layer), the adhesive force between the B1 layer (adhesive layer) and the A layer (gas barrier layer) was measured, whereas the adhesive force between the B1 layer (adhesive layer) and the B2 layer (TPU layer) was measured for the other Examples and Comparative Examples. The measurement was evaluated according to the following criteria A to D. The interlayer adhesiveness may be evaluated as being superior in the case of falling under the criteria A to C.

A: 20 N/10 mm or greater;
B: 15 N/10 mm or greater and less than 20 N/10 mm;
C: 10 N/10 mm or greater and less than 15 N/10 mm; and
D: less than 10 N/10 mm.

TABLE 1

| | | | Unit | Example 1 | Example 2 | Example 3 | Example 4 | Example 5 | Example 6 | Example 7 |
|---|---|---|---|---|---|---|---|---|---|---|
| Multilayered structure | gas barrier layer (A layer) | resin type | — | EVOH (1) | EVOH (1) | EVOH (1) | EVOH (1) | EVOH (1) | EVOH (1) | EVOH (1) |
| | | lamination number | — | 9 | 9 | 9 | 9 | 2 | 9 | 9 |
| | | average thickness of each one layer | μm | 0.5 | 0.5 | 0.5 | 0.5 | 2.25 | 0.5 | 0.5 |
| | adhesive layer (B1 layer) | resin type | — | E-SBS (1) | E-SBS (2) | E-SBS (1) | E-SBS (2) | E-SBS (2) | E-SBS (2)/SBS = 1/1 | MA-SBS |
| | | lamination number | — | 1 | 2 | 2 | 2 | 3 | 2 | 2 |
| | | iodine value | g/100 g | 239 | 249 | 239 | 249 | 249 | 260 | 266 |
| | | amount of functional group | mmol/g | 1 | 0.5 | 1 | 0.5 | 0.5 | 0.25 | 0.06 |
| | | average thickness of each one layer | μm | 5 | 5 | 5 | 11 | 5 | 5 | 5 |
| | other elastomer layer (B2 layer) | resin type | — | TPU | TPU | TPU | TPU | none | TPU | TPU |
| | | lamination number | — | 10 | 10 | 10 | 10 | 0 | 10 | 10 |
| | | average thickness of each one layer | μm | 4.5 | 4.5 | 4.5 | 4.5 | 0 | 4.5 | 4.5 |
| | diene rubber layer (C layer) | resin type | — | natural rubber | natural rubber | natural rubber | natural rubber | natural rubber | natural rubber | natural rubber |
| | | lamination number | — | 1 | 1 | 1 | 1 | 1 | 1 | 1 |
| | | average thickness of each one layer | μm | 400 | 400 | 400 | 400 | 400 | 400 | 400 |
| | whole | average thickness of whole laminate | μm | 455 | 460 | 460 | 472 | 420 | 460 | 460 |
| Evaluations of characteristics | | oxygen permeation rate | *1 | 25 | 25 | 25 | 30 | 30 | 31 | 27 |
| | | adhesive force between B1 layer and C layer | — | A | A | A | B | A | A | A |

TABLE 1-continued

|  |  |  | | | | | | | | |
|---|---|---|---|---|---|---|---|---|---|---|
| | | pinhole number after bending | number | 0 | 1 | 0 | 0 | 8 | 1 | 1 |
| | | adhesive force between B1 layer and A layer/B2 layer | — | A | A | A | A | A | B | C |

| | | | Unit | Example 8 | Example 9 | Example 10 | Example 11 | Example 12 | Example 13 |
|---|---|---|---|---|---|---|---|---|---|
| Multilayered structure | gas barrier layer (A layer) | resin type | — | EVOH (1) | EVOH (1) | EVOH (1) | nylon 6 | MXD6 | PGA |
| | | lamination number | — | 9 | 9 | 9 | 9 | 9 | 9 |
| | | average thickness of each one layer | μm | 0.5 | 0.5 | 0.5 | 0.5 | 0.5 | 0.5 |
| | adhesive layer (B1 layer) | resin type | — | MA-SEBS/SBS = 1/9 | E-SBS (2)/SBS = 1/9 | MA-SEBS/SIS = 1/9 | E-SBS (1) | E-SBS (1) | E-SBS (1) |
| | | lamination number | — | 2 | 2 | 2 | 2 | 2 | 2 |
| | | iodine value | g/100 g | 244 | 268 | 295 | 239 | 239 | 239 |
| | | amount of functional group | mmol/g | 0.002 | 0.05 | 0.002 | 1 | 1 | 1 |
| | | average thickness of each one layer | μm | 5 | 5 | 5 | 5 | 5 | 5 |
| | other elastomer layer (B2 layer) | resin type | — | TPU | TPU | TPU | TPU | TPU | TPU |
| | | lamination number | — | 10 | 10 | 10 | 10 | 10 | 10 |
| | | average thickness of each one layer | μm | 4.5 | 4.5 | 4.5 | 4.5 | 4.5 | 4.5 |
| | diene rubber layer (C layer) | resin type | — | natural rubber | natural rubber | natural rubber | natural rubber | natural rubber | natural rubber |
| | | lamination number | — | 1 | 1 | 1 | 1 | 1 | 1 |
| | | average thickness of each one layer | μm | 400 | 400 | 400 | 400 | 400 | 400 |
| | whole | average thickness of whole laminate | μm | 460 | 460 | 460 | 460 | 460 | 460 |
| Evaluations of characteristics | | oxygen permeation rate | *1 | 31 | 26 | 25 | 211 | 7 | 5 |
| | | adhesive force between B1 layer and C layer | — | A | A | A | A | A | A |
| | | pinhole number after bending | number | 1 | 1 | 0 | 7 | 9 | 8 |
| | | adhesive force between B1 layer and A layer/B2 layer | — | C | C | C | A | A | C |

*1: The unit of oxygen permeation rate being "mL/(m2 · day · atm)".

TABLE 2

| | | | unit | Example 14 | Example 15 | Example 16 | Example 17 | Example 18 | Example 19 |
|---|---|---|---|---|---|---|---|---|---|
| Multilayered structure | gas barrier layer (A layer) | resin type | — | EVOH (2) | EVOH (2) | EVOH (2) | EVOH (2) | EVOH (2) | EVOH (2) |
| | | lamination number | — | 9 | 9 | 9 | 9 | 2 | 9 |
| | | average thickness of each one layer | μm | 0.5 | 05 | 0.5 | 0.5 | 2.25 | 0.5 |
| | adhesive layer (B1 layer) | resin type | — | E-SBS (1) | E-SBS (2) | E-SBS (1) | E-SBS (2) | E-SBS (2) | E-SBS (2)/SBS = 1/1 |
| | | lamination number | — | 1 | 2 | 2 | 2 | 3 | 2 |
| | | iodine value | g/100 g | 239 | 249 | 239 | 249 | 249 | 260 |
| | | amount of functional group | mmol/g | 1 | 0.5 | 1 | 0.5 | 0.5 | 0.25 |
| | | average thickness of each one layer | μm | 5 | 5 | 5 | 11 | 5 | 5 |
| | other elastomer layer (B2 layer) | resin type | — | TPU | TPU | TPU | TPU | none | TPU |
| | | lamination number | — | 10 | 10 | 10 | 10 | 0 | 10 |
| | | average thickness of each one layer | μm | 4.5 | 4.5 | 4.5 | 4.5 | 0 | 4.5 |
| | diene rubber layer (C layer) | resin type | — | natural rubber | natural rubber | natural rubber | natural rubber | natural rubber | natural rubber |
| | | lamination number | — | 1 | 1 | 1 | 1 | 1 | 1 |
| | | average thickness of each one layer | μm | 400 | 400 | 400 | 400 | 400 | 400 |
| | whole | average thickness of whole laminate | μm | 455 | 460 | 460 | 472 | 420 | 460 |
| Evaluations of characteristics | | oxygen permeation rate | *1 | 3 | 3 | 3 | 3 | 3 | 3 |
| | | adhesive force between B1 layer and C layer | — | A | A | A | B | A | A |

TABLE 2-continued

|  |  | | Example 20 | Example 21 | Example 22 | Example 23 | Example 24 | Example 25 | Example 26 |
|---|---|---|---|---|---|---|---|---|---|
|  | pinhole number after bending | number | 11 | 12 | 11 | 11 | 16 | 12 | |
|  | adhesive force between B1 layer and A layer/B2 layer | — | A | A | A | A | A | B | |

|  |  | unit | Example 20 | Example 21 | Example 22 | Example 23 | Example 24 | Example 25 | Example 26 |
|---|---|---|---|---|---|---|---|---|---|
| Multilayered structure | gas barrier layer (A layer) resin type | — | EVOH (2) | EVOH (2) | EVOH (2) | EVOH (2) | EVOH (3) | EVOH (4) | EVOH (5) |
|  | lamination number | — | 9 | 9 | 9 | 9 | 9 | 9 | 9 |
|  | average thickness of each one layer | μm | 0.5 | 0.5 | 0.5 | 0.5 | 0.5 | 0.5 | 0.5 |
|  | adhesive layer (B1 layer) resin type | — | MA-SBS | MA-SEBS/SBS = 2/8 | E-SBS (2)/SBS = 1/9 | MA-SEBS/SIS = 1/9 | E-SBS (1) | E-SBS (1) | E-SBS (1) |
|  | lamination number | — | 2 | 2 | 2 | 2 | 2 | 2 | 2 |
|  | iodine value | g/100 g | 266 | 212 | 268 | 295 | 239 | 239 | 239 |
|  | amount of functional group | mmol/g | 0.06 | 0.002 | 0.05 | 0.002 | 1 | 1 | 1 |
|  | average thickness of each one layer | μm | 5 | 5 | 5 | 5 | 5 | 5 | 5 |
|  | other elastomer layer (B2 layer) resin type | — | TPU | TPU | TPU | TPU | TPU | TPU | TPU |
|  | lamination number | — | 10 | 10 | 10 | 10 | 10 | 10 | 10 |
|  | average thickness of each one layer | μm | 4.5 | 4.5 | 4.5 | 4.5 | 4.5 | 4.5 | 4.5 |
|  | diene rubber layer (C layer) resin type | — | natural rubber | natural rubber | natural rubber | natural rubber | natural rubber | natural rubber | natural rubber |
|  | lamination number | — | 1 | 1 | 1 | 1 | 1 | 1 | 1 |
|  | average thickness of each one layer | μm | 400 | 400 | 400 | 400 | 400 | 400 | 400 |
|  | whole average thickness of whole laminate | μm | 460 | 460 | 460 | 460 | 460 | 460 | 460 |
| Evaluations of characteristics | oxygen permeation rate | *1 | 3 | 3 | 3 | 3 | 26 | 23 | 12 |
|  | adhesive force between B1 layer and C layer | — | A | C | A | A | A | A | A |
|  | pinhole number after bending | number | 13 | 11 | 11 | 5 | 1 | 7 | 3 |
|  | adhesive force between B1 layer and A layer/B2 layer | — | C | C | C | C | A | A | A |

*1: The unit of oxygen permeation rate being "mL/(m2 · day · atm)".

TABLE 3

|  |  | unit | Comparative Example 1 | Comparative Example 2 | Comparative Example 3 | Comparative Example 4 | Comparative Example 5 |
|---|---|---|---|---|---|---|---|
| Multilayered structure | gas barrier layer (A layer) resin type | — | EVOH (1) | EVOH (1) | EVOH (1) | EVOH (1) | EVOH (2) |
|  | lamination number | — | 9 | 9 | 9 | 1 | 1 |
|  | average thickness of each one layer | μm | 0.5 | 0.5 | 0.5 | 4.5 | 0.5 |
|  | adhesive layer (B1 layer) resin type | — | SIS | MA-SEBS | MA-SEBS/SBS = 1/1 | E-SBS (2) | E-SBS (2) |
|  | lamination number | — | 2 | 2 | 2 | 2 | 2 |
|  | iodine value | g/100 g | 335 | 10 | 140 | 249 | 249 |
|  | amount of functional group | mmol/g | 0 | 0.02 | 0.01 | 0.5 | 0.5 |
|  | average thickness of each one layer | μm | 5 | 5 | 5 | 5 | 5 |
|  | other elastomer layer (B2 layer) resin type | — | TPU | TPU | TPU | none | none |
|  | lamination number | — | 10 | 10 | 10 | 0 | 0 |
|  | average thickness of each one layer | μm | 4.5 | 4.5 | 4.5 | 0 | 0 |
|  | diene rubber layer (C layer) resin type | — | natural rubber | natural rubber | natural rubber | natural rubber | natural rubber |
|  | lamination number | — | 1 | 1 | 1 | 1 | 1 |
|  | average thickness of each one layer | μm | 400 | 400 | 400 | 400 | 400 |
|  | whole average thickness of whole laminate | μm | 460 | 460 | 460 | 415 | 411 |
| Evaluations of characteristics | oxygen permeation rate | *1 | 41 | 30 | 31 | 30 | 3 |
|  | adhesive force between B1 layer and C layer | — | A | D | D | A | A |

TABLE 3-continued

|  | unit | Comparative Example 1 | Comparative Example 2 | Comparative Example 3 | Comparative Example 4 | Comparative Example 5 |
|---|---|---|---|---|---|---|
| pinhole number after bending | number | 0 | 3 | 1 | 21 | 31 |
| adhesive force between B1 layer and A layer/B2 layer | — | D | C | C | A | A |

*1: The unit of oxygen permeation rate being "mL/(m2 · day · atm)".

From the results shown in Tables 1 to 3, it is revealed that the multilayered structure of each Example was superior in the interlayer adhesive force and the flex resistance. On the other hand, in the multilayered structure of Comparative Example 1, the iodine value of the B1 layer was too great, and due to no functional group being introduced, the adhesive force between the B1 layer and the B2 layer was weak. In the multilayered structures of Comparative Examples 2 and 3, the iodine value of the B1 layer was low, and the adhesive force between the B1 layer and the C layer was weak. In addition, the multilayered structures of Comparative Examples 4 and 5 had small layer numbers, and exhibited great pinhole numbers after bending, indicating that the flex resistance was inferior.

When Examples are compared with each other, the multilayered structures of Examples 4 and 17 having a comparatively thick B1 layer that was in contact with the C layer were elucidated to exhibit somewhat inferior adhesive force between the B1 layer and the C layer. It was further revealed that the multilayered structures of Example 5, 18 not including the B2 layer, with a smaller layer number were somewhat inferior in the flex resistance. In Examples 7 to 10, 20 to 23 including a small amount of the functional group in the polymer used for the B1 layer exhibited somewhat weak adhesive force between the B1 layer and the B2 layer.

Reference Example 1

Coextrusion was carried out by a similar procedure to that of Example 1 except that 10 parts by mass of a tackifier (manufactured by Yasuhara Chemical Co., Ltd., terpene resin) were dry blended with E-SBS (1) with respect to 100 parts by mass of E-SBS (1). Although attachment of the laminate to the cooling roller was needlessly found, an intended laminate was obtained. However, resulting from excessive attachment of the laminate to the cooling roller, the operation was stopped two times during the continuous operation for 8 hours.

Reference Example 2

Coextrusion was carried out by a similar procedure to that of Reference Example 1 except that the amount of a tackifier (manufactured by Yasuhara Chemical Co., Ltd., terpene resin) added was 30 parts by mass with respect to 100 parts by mass of E-SBS (1). The laminate needlessly attached to the cooling roller, thereby making stably obtaining the laminate difficult.

INDUSTRIAL APPLICABILITY

The laminate and the multilayered structure of the embodiments of the present invention can be suitably used as, e.g., a material of a rubber film required to have gas barrier properties, durability, stretchability and the like, for example, as a material of an inner liner for a pneumatic tire, an inner package of an accumulator, inflated ball, air spring and the like.

EXPLANATION OF THE REFERENCE SYMBOLS 10, 20 laminate
30, 40 multilayered structure
1 A layer (gas barrier layer)
2 B1 layer (adhesive layer)
3 B2 layer (other elastomer layer)
4 C layer (diene rubber layer)

The invention claimed is:

1. A laminate comprising:
a plurality of as barrier layers (A) formed from a polymer comprising a gas barrier resin; and
one or a plurality of elastomer layer(s) (B) comprising at least one adhesive layer (B1), wherein
a sum of number of the gas barrier layers (A) and number of the elastomer layer(s) (B) is from 5 to 300,
the adhesive layer (B1) is laminated as at least one outermost layer,
the adhesive layer (B1) comprises a styrene elastomer and is formed from a polymer having an iodine value of 200 to 300, and
an average thickness of the adhesive layer (B1) laminated as the outermost layer is from 0.1 μm to 10 μm.

2. The laminate according to claim 1, where
the styrene elastomer comprises an epoxy group in a main chain thereof, and
a content of the epoxy group in a total polymer from which the adhesive layer (B1) is formed is from 0.1 mmol/g to 2 mmol/g.

3. The laminate according to claim 1, wherein
an average thickness of each one layer of the gas barrier layers (A) is from 0.1 μm to 15 μm, and
an average thickness of each one layer of the elastomer layer(s) (B) is from 0.1 μm to 30 μm.

4. The laminate according to claim 1, wherein a total thickness of all the gas barrier layers (A) and all the elastomer layer(s) (B) is from 15 μm to 500 μm.

5. The laminate according to claim 1, wherein the one or a plurality of elastomer layer(s) (B) comprises a further elastomer layer (B2) other than the adhesive layer (B1).

6. The laminate according to claim 5, wherein each of the gas barrier layer (A) and the further elastomer layer (B2) are laminated alternately.

7. The laminate according to claim 5, wherein the further elastomer layer (B2) is formed from a polymer comprising a polyurethane elastomer.

8. The laminate according to claim 1, wherein
every one of the elastomer layer(s) (B) is the adhesive layer (B1), and each of the gas barrier layers (A) the adhesive layer (B1) are laminated alternately.

9. A method for producing the laminate according to claim 1, the method comprising coextruding:
a polymer for forming the gas barrier layers (A); and
a polymer for forming the one or a plurality of elastomer layer(s) (B).

10. A multilayered structure comprising:
the laminate according to claim 1; and
a diene rubber layer (C) laminated on an outer surface of the adhesive layer (B1) having been laminated as the outermost layer of the laminate.

11. A method for producing the multilayered structure according to claim 10, the method comprising:
coextending a polymer for forming the gas barrier layers (A), and a polymer for forming the one or a plurality of elastomer layer(s) (B); and
thermally bonding a diene rubber layer (C) to a structure obtained after the coextruding.

* * * * *